United States Patent
Ponçot et al.

(10) Patent No.: US 12,481,370 B2
(45) Date of Patent: Nov. 25, 2025

(54) TRAINING A GESTURE RECOGNITION MODEL USING TRANSFORMED GESTURE DATA

(71) Applicant: TDK CORPORATION, Tokyo (JP)

(72) Inventors: Rémi Louis Clément Ponçot, Grenoble (FR); Juan S Mejia Santamaria, San Jose, CA (US); Abbas Ataya, Menlo Park, CA (US); Etienne De Foras, Saint Nazaire les Eymes (FR); Bruno Flament, Saint Julien de Ratz (FR)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 18/542,263

(22) Filed: Dec. 15, 2023

(65) Prior Publication Data

US 2024/0201793 A1 Jun. 20, 2024

Related U.S. Application Data

(60) Provisional application No. 63/387,927, filed on Dec. 16, 2022.

(51) Int. Cl.
*G06F 3/01* (2006.01)
*G01C 21/16* (2006.01)

(52) U.S. Cl.
CPC ............ *G06F 3/017* (2013.01); *G01C 21/16* (2013.01); *G06F 3/011* (2013.01)

(58) Field of Classification Search
CPC ........ G06F 3/017; G06F 3/011; G06F 3/0346; G01C 21/16
See application file for complete search history.

(56) References Cited

U.S. PATENT DOCUMENTS

| | | | | |
|---|---|---|---|---|
| 2012/0235902 | A1* | 9/2012 | Eisenhardt | G06F 3/017 345/156 |
| 2015/0261495 | A1* | 9/2015 | Smus | G06F 3/167 345/156 |
| 2020/0050268 | A1* | 2/2020 | Wu | G06F 3/014 |

FOREIGN PATENT DOCUMENTS

CN 113609999 A * 11/2021 ....... G06F 18/23213

* cited by examiner

*Primary Examiner* — David D Davis

(57) ABSTRACT

In a method for training a gesture recognition model, gesture data is collected from an inertial measurement unit (IMU) positioned on one side of a user, wherein the IMU is capable of collecting data when positioned on either side of the user. A transformation is applied to the gesture data, wherein the transformation generates transformed gesture data that is independent of either side of the user. A gesture recognition model is trained using the transformed gesture data.

19 Claims, 8 Drawing Sheets

TRAINING A GESTURE RECOGNITION MODEL USING TRANSFORMED GESTURE DATA

RELATED APPLICATION

This application claims priority to and the benefit of U.S. Provisional Patent Application 63/387,927, filed on Dec. 16, 2022, entitled "INDEPENDENT RIGHT/LEFT WORN GESTURE RECOGNITION SOLUTION," by Poncot, et al., and assigned to the assignee of the present application, which is incorporated herein by reference in its entirety.

BACKGROUND

Mobile electronic devices often have limited resources for computing ability, so it is beneficial to design systems within the mobile device to be efficient. For example, wearable devices that utilize sensors inputs to perform classification for identifying gestures typically have limited memory and processing power. As such, classification is limited to the on-device memory, requiring training of the classification probability within the constraints of the on-device memory.

BRIEF SUMMARY

In a method for training a gesture recognition model, gesture data is collected from an inertial measurement unit (IMU) positioned on one side of a user, wherein the IMU is capable of collecting data when positioned on either side of the user. A transformation is applied to the gesture data, wherein the transformation generates transformed gesture data that is independent of either side of the user. A gesture recognition model is trained using the transformed gesture data.

BRIEF DESCRIPTION OF DRAWINGS

The accompanying drawings, which are incorporated in and form a part of the Description of Embodiments, illustrate various non-limiting and non-exhaustive embodiments of the subject matter and, together with the Description of Embodiments, serve to explain principles of the subject matter discussed below. Unless specifically noted, the drawings referred to in this Brief Description of Drawings should be understood as not being drawn to scale and like reference numerals refer to like parts throughout the various figures unless otherwise specified.

DETAILED DESCRIPTION

Figure 1:
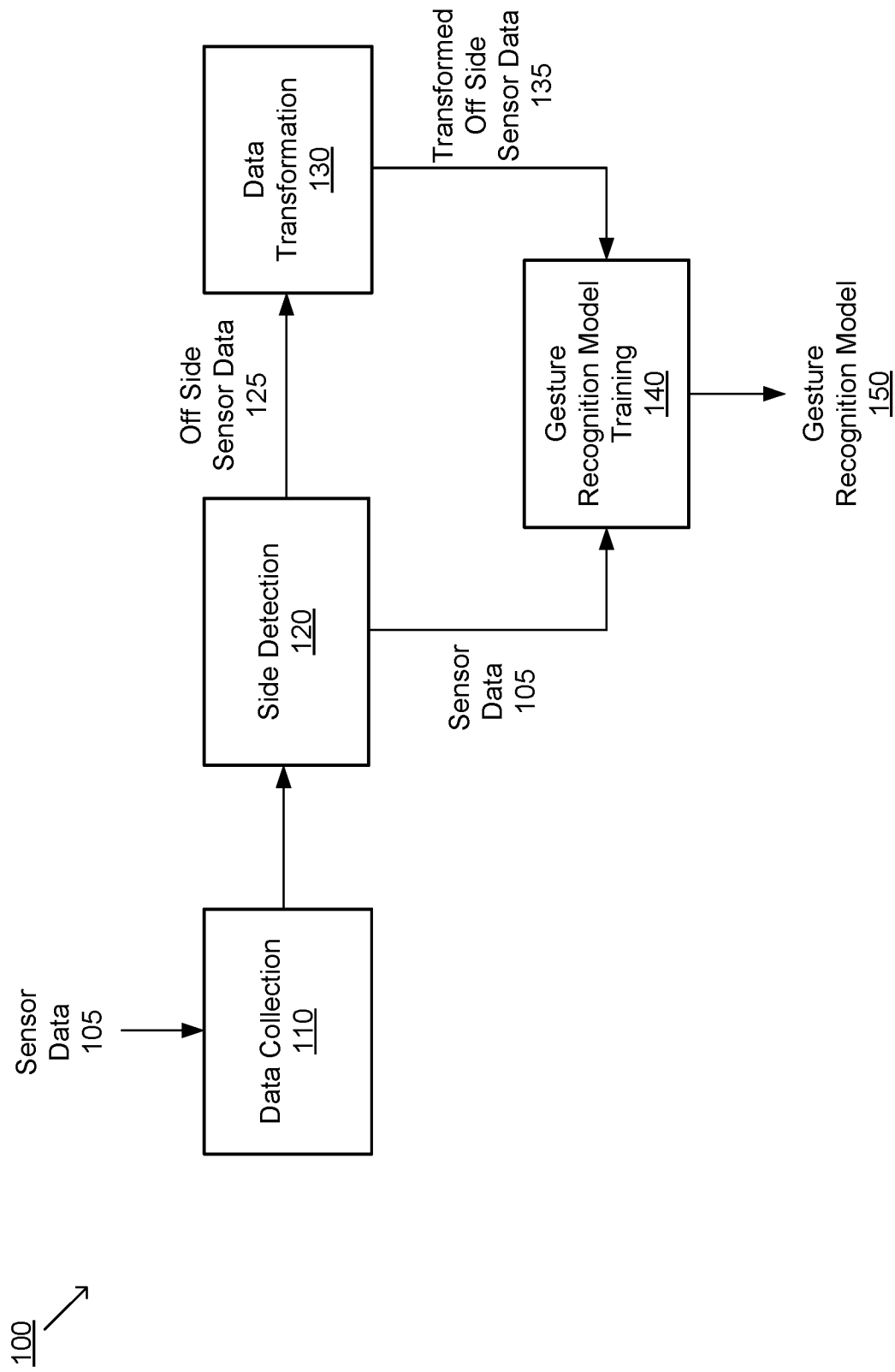
FIG. 1 is a block diagram illustrating an example system for training a gesture recognition model, in accordance with embodiments.

The following Description of Embodiments is merely provided by way of example and not of limitation. Furthermore, there is no intention to be bound by any expressed or implied theory presented in the preceding background or in the following Description of Embodiments.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Notation and Nomenclature

Some portions of the detailed descriptions which follow are presented in terms of procedures, logic blocks, processing and other symbolic representations of operations on data within an electrical device. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of acoustic (e.g., ultrasonic) signals capable of being transmitted and received by an electronic device and/or electrical or magnetic signals capable of being stored, transferred, combined, compared, and otherwise manipulated in an electrical device.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "collecting," "applying," "training," "determining," "transforming," "deploying," "receiving," "identifying," "analyzing," "processing," "comparing," "generating," "outputting," or the like, refer to the actions and processes of an electronic device such as an electrical device.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, logic, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example ultrasonic sensing system and/or mobile electronic device described herein may include components other than those shown, including well-known components.

Various techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

Various embodiments described herein may be executed by one or more processors, such as one or more motion processing units (MPUs), sensor processing units (SPUs), host processor(s) or core(s) thereof, digital signal processors (DSPs), general purpose microprocessors, application specific integrated circuits (ASICs), application specific instruction set processors (ASIPs), field programmable gate arrays (FPGAs), a programmable logic controller (PLC), a complex programmable logic device (CPLD), a discrete gate or transistor logic, discrete hardware components, or any combination thereof designed to perform the functions described herein, or other equivalent integrated or discrete logic circuitry. The term "processor," as used herein may refer to any of the foregoing structures or any other structure suitable for implementation of the techniques described herein. As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Moreover, processors can exploit nano-scale architectures such as, but not limited to, molecular and quantum-dot based transistors, switches and gates, in order to optimize space usage or enhance performance of user equipment. A processor may also be implemented as a combination of computing processing units.

In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration.

Overview of Discussion

Discussion begins with a description of an example system for training a gesture recognition model that detects a side of a user on which a device is worn and is capable of transforming gesture data if the device is worn on the off hand for which the gesture recognition model is trained. An example system for training a gesture recognition model that transforms all gesture recognition data and is independent of the side of a user on which the device is worn is then described. An example system for using a deployed gesture recognition model trained to one side of a user that is capable of being used and worn on either side of the user is then described. An example system for using a deployed gesture recognition model that is independent of the side of a user on which the device is worn is then described. Example operations of training a gesture recognition model are then described.

Conventional gesture recognition models for use in wearable devices that can be used or worn on either side of a user (e.g., a smart watch, fitness trackers, smart rings, etc.) are typically trained using data from many users wearing the device on both sides, generating a gesture recognition model that includes trained left side and right side data or two separate recognition models for each side use case. As most devices only have one user that uses the device on one side of their body, no more than roughly half of the gesture recognition model(s) is ever accessed or used, resulting in significant memory and processing waste. The described embodiments provide for training a gesture recognition model that is trained using data from one side of a user, or is independent of the side of a user, that is capable of use for detecting gestures when worn on either side of the user, thereby providing significant memory and processing saving over conventionally trained gesture recognition models. Generally, the described embodiments provide a gesture recognition model that requires roughly half the memory and processing requirements over conventional gesture recognition model. This is of particular importance in the wearable device space, where power management and consumption are significant design considerations.

Example embodiments described herein provide methods and systems for training a gesture recognition model that is independent of either side of a user on which the training data is received and will ultimately be used. Gesture data is collected from an inertial measurement unit (IMU) positioned on one side of a user, wherein the IMU is capable of collecting data when positioned on either side of the user. A transformation is applied to the gesture data, wherein the transformation generates transformed gesture data that is independent of either side of the user (e.g., normalizes the gesture data). A gesture recognition model is trained using the transformed gesture data.

In some embodiments, a gesture recognition model that is trained using gesture data from a device worn on either side of a user is described, where the gesture recognition model is trained according to a primary side (e.g., left side) such that gesture data received from a device worn on the off side (e.g., right side) is transformed prior to training to represent gesture data from the primary side of the user. During deployment, a device using gesture recognition model trained to one side of a user is configured to determine a side of a user on which the device is worn, and configured to transform the user gesture data if the device is worn on the off side on which the gesture recognition model was trained.

In some embodiments, the transformation includes a symmetric transformation of accelerometer data of the gesture data and a rotation transformation of gyroscope data of the gesture data. In some embodiments, the transformation includes a symmetric transformation of the gesture data for a Y-Z plane of a frame of reference of the IMU and a rotation of 180 degrees of the gesture data around an X-axis of the frame of reference of the IMU.

In other embodiments, a gesture recognition model that is trained using gesture data from a device worn on either side of a user is described, where all gesture data is transformed to be independent of the side of a user on which the device is worn. During deployment, a device using gesture recognition model trained independent of the side of a user on which the device is worn is configured to transform the user gesture data to be independent of the side of a user on which the device is worn prior to performing gesture recognition.

In some embodiments, the transformation includes an absolute value transformation of the gesture data. In some embodiments, the transformation includes an absolute value symmetric transformation of accelerometer data of the gesture data and a rotation transformation of gyroscope data of the gesture data. In some embodiments, the transformation includes an absolute value symmetric transformation of the gesture data for a Y-Z plane of a frame of reference of the IMU and an absolute value rotation of 180 degrees of the gesture data around an X-axis of the frame of reference of the IMU.

Example Systems for Training a Gesture Recognition Model

Example embodiments described herein provide methods and systems for training and using a gesture recognition model that is independent of the side on which side of a user a device is used for training. In some embodiments, the described technology provide a generic machine learning algorithm (e.g., a gesture recognition model) that can detect gestures regardless of the side of the user on which the device is worn (e.g., a smart watch worn on a left wrist). For example, some described embodiments provide a gesture recognition model that is trained on only one side of a user (e.g., the left side) while being capable of detecting gestures when used on either side of a user (e.g., the right side or the left side). Other example embodiments provide a gesture recognition model that is trained independent of either side of a user and is capable of use on either side of a user.

FIG. 1 is a block diagram illustrating an example system 100 for training a gesture recognition model, in accordance with embodiments. System 100 is configured to train gesture recognition model using data from one side of a user, referred to herein as the "primary" side, and uses a data transformation to transform training data received from devices worn on the other side of users, referred to herein as the "off" side, to primary side data. In accordance with various embodiments, system 100 includes data collection module 110, side detection module 120, data transformation module 130, and gesture recognition model training module 140. It should be appreciated that data collection module 110, side detection module 120, data transformation module 130, and gesture recognition model training module 140, can be under the control of a single component of an enterprise computing environment (e.g., a distributed computer system or computer system 600) or can be distributed over multiple components (e.g., a virtualization infrastructure or a cloud-based infrastructure). In some embodiments, system 100 is comprised within or is an enterprise system.

Sensor data 105 is received at data collection module 110. It should be appreciated that sensor data 105 is data received from a plurality of electronic devices for use in training a gesture recognition model 150. For example, sensor data 105 can include data generated at inertial measurement units (IMUs) of electronic devices. Sensor data 105 can include data representing specific force, angular rate, and orientation of the source device (e.g., IMU). The IMUs can include accelerometers and gyroscopes for generating sensor data 105. It should be appreciated that sensor data 105 can be subjected to a pre-processing for eliminating noise and putting sensor data 105 in a more appropriate format for performing classification. Such pre-processing can be performed at data collection module 110 or prior to receipt at data collection module 110.

Side detection module 120 receives sensor data 105 and is configured to determine from which side of a user sensor data 105 was collected. Sensor data 105 received from an electronic device worn on the primary side (e.g., the side for which gesture recognition model 150 is trained) is forwarded to gesture recognition model training module 140. Sensor data 105 received from an electronic device worn on the off side (e.g., the opposite side for which gesture recognition model 150 is trained), also referred to as off side sensor data 125, is forwarded to data transformation module 130 for transformation.

Data transformation module 130 is configured to apply a transformation to the gesture data, wherein the transformation transforms sensor data 105 such that transformed off side sensor data 135 is representative of sensor data collected using a device worn on the primary side of a user. In some embodiments, data transformation module 130 is configured to perform a transformation including a symmetric transformation of accelerometer data of sensor data 105 and a rotation transformation of gyroscope data of sensor data 105. In some embodiments, the transformation includes a symmetric transformation of sensor data 105 for a Y-Z plane of a frame of reference of the IMU and a rotation of 180 degrees of sensor data 105 around an X-axis of the frame of reference of the IMU. It should be appreciated that any number of transformations can be utilized or performed to accomplish the data transformation.

Figures 5A, 5B:
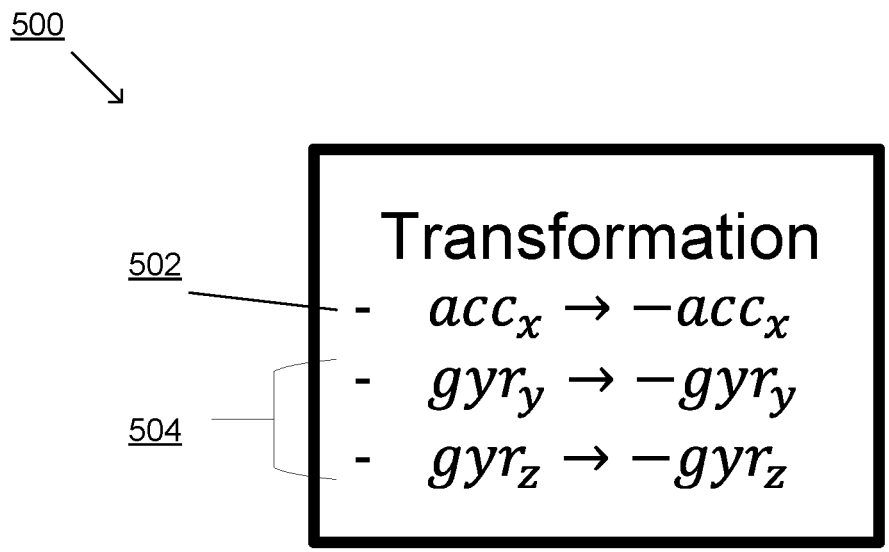
FIGS. 5A and 5B are example transformations for use in transforming gesture data, according to various embodiments.

FIG. 5A is an example transformation 500 for use in transforming gesture data collected from a device worn on one side of a user (e.g., an off side) to represent data collected from a device worn on the other side of the user (e.g., a primary side). As illustrated, accelerometer data transformation 502 transforms accelerometer data symmetrically across the Y-Z plane of the frame of reference of the source IMU. Accelerometer data transformation 502 uses single plane symmetry. Gyroscope data transformation 504 transforms gyroscope data rotationally around the X axis of the frame of reference of the source IMU. In some embodiments, gyroscope data transformation 504 can also be obtained using two symmetric planar transformations.

Returning to FIG. 1, gesture recognition model training module 140 receives sensor data 105 collected from devices worn on the primary side of users and transformed off side sensor data 135 that is transformed to be representative of data collected from devices worn on the primary side of users. Gesture recognition model training module 140 is configured to train gesture recognition model 150 using sensor data 105 and transformed off side sensor data 135, such that gesture recognition model 150 is trained using sensor data from a primary side of a user.

During deployment, a device using gesture recognition model 150 that is trained to one side of a user is configured to determine a side of a user on which the device is worn, and configured to transform the user gesture data if the device is worn on the off side on which gesture recognition model 150 was trained.

System 100 is configured to train gesture recognition model 150 using sensor data 105 received from multiple users, some of which wearing devices on the primary side and some of which wearing devices on the off side. For example, system 100 can be used to generate gesture recognition model 150 trained for use in a smart watch worn on the left side of a user. During training of gesture recognition model 150, sensor data 105 that is received from smart watches worn on the right side of the user is transformed at data transformation module 130 to represent sensor data collected from a smart watch worn on the right side of the user. Gesture recognition model training module 140 only receives sensor data that is representative of sensor data for smart watches worn on the left wrist (e.g., directly or through transformation), such that gesture recognition model 150 is trained using only left side sensor data. During deployment of gesture recognition model 150, a side detection operation is performed and if the user is wearing the device on their right side (e.g., the off side of gesture recognition model 150), the sensor data is transformed (e.g., using the transformation used at data transformation module 130) to generate primary side data for use of gesture recognition model 150.

Figure 2:
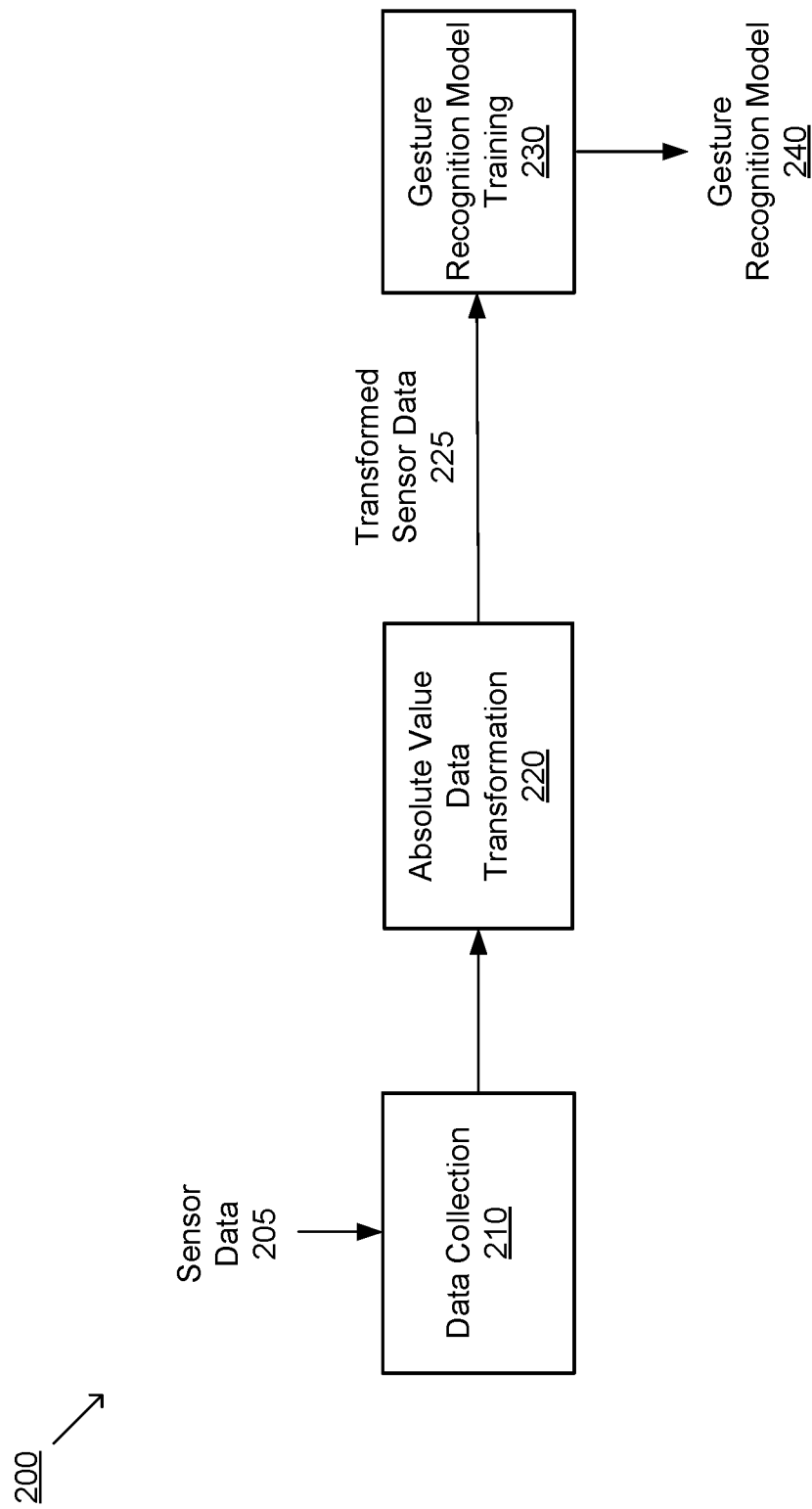
FIG. 2 is a block diagram illustrating an example system for training a gesture recognition model, in accordance with other embodiments.

FIG. 2 is a block diagram illustrating an example system 200 for training a gesture recognition model, in accordance with embodiments. System 200 is configured to train gesture recognition model 240 such that gesture recognition model 240 is trained independent of either side of a user and is capable of use on either side of a user. In accordance with various embodiments, system 200 includes data collection module 210, absolute value data transformation module 220, and gesture recognition model training module 230. It should be appreciated that data collection module 210, absolute value data transformation module 220, and gesture recognition model training module 230, can be under the control of a single component of an enterprise computing environment (e.g., a distributed computer system or computer system 600) or can be distributed over multiple components (e.g., a virtualization infrastructure or a cloud-based infrastructure). In some embodiments, system 200 is comprised within or is an enterprise system.

Sensor data 205 is received at data collection module 210. It should be appreciated that sensor data 205 is data received from a plurality of electronic devices for use in training a gesture recognition model 240. For example, sensor data 205 can include data generated at inertial measurement units (IMUs) of electronic devices. Sensor data 205 can include data representing specific force, angular rate, and orientation of the source device (e.g., IMU). The IMUs can include accelerometers and gyroscopes for generating sensor data 205. It should be appreciated that sensor data 205 can be subjected to a pre-processing for eliminating noise and putting sensor data 205 in a more appropriate format for performing classification. Such pre-processing can be performed at data collection module 210 or prior to receipt at data collection module 210.

Absolute value data transformation module 220 is configured to apply a transformation to sensor data 205, wherein the transformation normalizes sensor data 205 such that transformed gesture data is independent of either side of the user. Absolute value data transformation module 220 is configured to perform an absolute value transformation of the gesture data. In some embodiments, absolute value data transformation module 220 is configured to perform a transformation including an absolute value symmetric transformation of accelerometer data of sensor data 205 and an absolute value rotation transformation of gyroscope data of sensor data 205. In some embodiments, the transformation includes an absolute value symmetric transformation of sensor data 205 for a Y-Z plane of a frame of reference of the IMU and an absolute value rotation of 180 degrees of sensor data 205 around an X-axis of the frame of reference of the IMU. It should be appreciated that any number of transformations can be utilized or performed to accomplish the data transformation.

FIG. 5B is an example transformation 510 for use in transforming gesture data collected from a device worn on either side of a user to normalize transformed sensor data. As illustrated, accelerometer data transformation 512 performs an absolute value transformation of accelerometer data symmetrically across the Y-Z plane of the frame of reference of the source IMU. Accelerometer data transformation 512 uses single plane symmetry. Gyroscope data transformation 514 performs an absolute value transformation of gyroscope data rotationally around the X axis of the frame of reference of the source IMU. In some embodiments, gyroscope data transformation 514 can also be obtained using two symmetric planar transformations.

Returning to FIG. 2, gesture recognition model training module 230 receives transformed sensor data 225 that is normalized to be independent of the side of a user on which a device is worn. Gesture recognition model training module 230 is configured to train gesture recognition model 240 using transformed sensor data 225, such that gesture recognition model 240 is trained independent of the side of a user on which the device is worn.

During deployment, a device using gesture recognition model 240 that is trained independent of the side of a user on which the device is worn is configured to transform all user gesture data to generate normalized transformed gesture data that is independent of the side of a user on which the device is worn.

System 200 is configured to train gesture recognition model 240 using sensor data 205 received from multiple users, for which the devices from which the training data is received can be worn on either side of a user. For example, system 200 can be used to generate gesture recognition model 240 trained independent of the side of a user on which the device is worn. During training of gesture recognition model 240, all sensor data 205 is subject to transformation that normalizes sensor data 205 such that the sensor data independent of the side of a user on which the device is worn. Gesture recognition model training module 230 only receives sensor data that is independent of the side of a user on which the device is worn. During deployment of gesture recognition model 240, all sensor data is normalized to be independent of the side of a user on which the device is worn for use of gesture recognition model 240.

Figure 3:
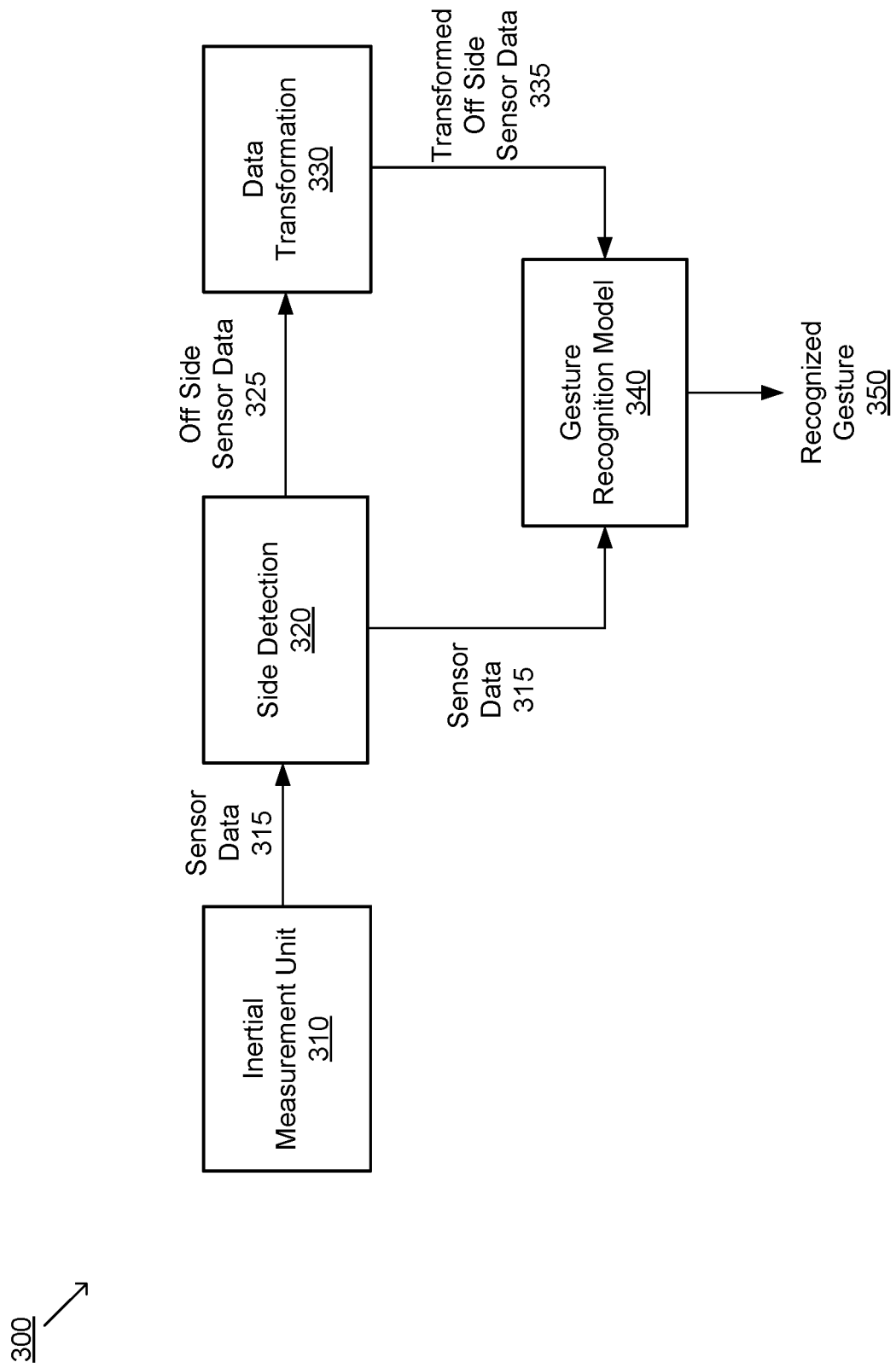
FIG. 3 is a block diagram illustrating an example system for gesture recognition using a gesture recognition model trained on one side of a person, in accordance with embodiments.

FIG. 3 is a block diagram illustrating an example system 300 for gesture recognition using gesture recognition model 340 trained on one side of a person, in accordance with embodiments. In accordance with various embodiments, system 300 includes inertial measurement unit (IMU) 310, side detection module 320, data transformation module 330, and gesture recognition model 340. It should be appreciated that IMU 310, side detection module 320, data transformation module 330, and gesture recognition model 340, are comprised within a wearable electronic device that is worn on one side of a user.

During operation of system 300, sensor data 315 is generated at IMU 310. For example, sensor data 315 can include data representing specific force, angular rate, and orientation of IMU 310. IMU 310 can include an accelerometer and a gyroscope for generating sensor data 315. It should be appreciated that sensor data 315 can be subjected to a pre-processing for eliminating noise and putting sensor data 315 in a more appropriate format for performing classification. Such pre-processing can be performed at IMU 310 or performed by another component of system 300 (not shown) prior to receipt at side detection module 320.

Side detection module 320 receives sensor data 315 and is configured to determine from which side of a user sensor data 315 was collected (e.g., which side of the user system 300 is worn). Sensor data 315 received from an electronic device worn on the primary side (e.g., the side for which gesture recognition model 350 is trained) is forwarded to gesture recognition model 340. Sensor data 315 received from an electronic device worn on the off side (e.g., the opposite side for which gesture recognition model 340 is trained) is forwarded to data transformation module 330 for transformation. It should be appreciated that side detection module 320 may only be performed during the setup of system 300, periodically performed (e.g., weekly or monthly), or performed at other intervals. As system 300 may be incorporated within a device that is typically associated with a single user, side detection may only need to be performed once or upon a system reset. Once side detection module 320 determines from which side of a user sensor data 315 was collected, side detection module 320 can forward data to one of data transformation module 330 or gesture recognition model 340 without further determining which side of a user system 300 is worn. For example, during setup of system 300, side detection module 320 can determine which side of a user system 300 is worn one time and store that determination for directing sensor data 315 to one of data transformation module 330 or gesture recognition model 340.

Where side detection module 320 determines that sensor data 315 is collected from a device worn on the off side of gesture recognition model 340, sensor data 315 is forwarded to data transformation module 330. Data transformation module 330 is configured to apply a transformation to off side sensor data 325, wherein the transformation transforms off side sensor data 325 such that transformed off side sensor data 335 is representative of sensor data collected using a device worn on the primary side of a user. In some embodiments, data transformation module 330 is configured to perform a transformation including a symmetric transformation of accelerometer data of sensor data 315 and a rotation transformation of gyroscope data of sensor data 315. In some embodiments, the transformation includes a symmetric transformation of sensor data 315 for a Y-Z plane of a frame of reference of the IMU and a rotation of 180 degrees of sensor data 315 around an X-axis of the frame of reference of the IMU. It should be appreciated that any number of transformations can be utilized or performed to accomplish the data transformation. As presented above, FIG. 5A is an example transformation 500 for use in transforming gesture data collected from a device worn on one side of a user (e.g., an off side) to represent data collected from a device worn on the other side of the user (e.g., a primary side).

Gesture recognition model 340 receives one of sensor data 315 transformed off side sensor data 335. Gesture recognition model 340 is configured to perform gesture classification using one of sensor data 315 transformed off side sensor data 335, where both sensor data 315 transformed off side sensor data 335 are representative of sensor data trained using sensor data from a primary side of a user. Recognized gesture 350 is the output of gesture recognition model 340.

For example, gesture recognition model 340 is deployed in a smart watch and is trained using sensor data representative of a smart watch worn on the left side of a user. During deployment of gesture recognition model 340, a side detection operation is performed and if the user is wearing the device on their right side (e.g., the off side of gesture recognition model 340), the sensor data is transformed (e.g., using the transformation used at data transformation module 330) to generate primary side data for use of gesture recognition model 340. If the user is wearing the device on their left side (e.g., the primary side of gesture recognition model 340), no transformation of sensor data 315 is performed, and sensor data 315 is used at gesture recognition model 340 for determining recognized gesture 350.

Figure 4:
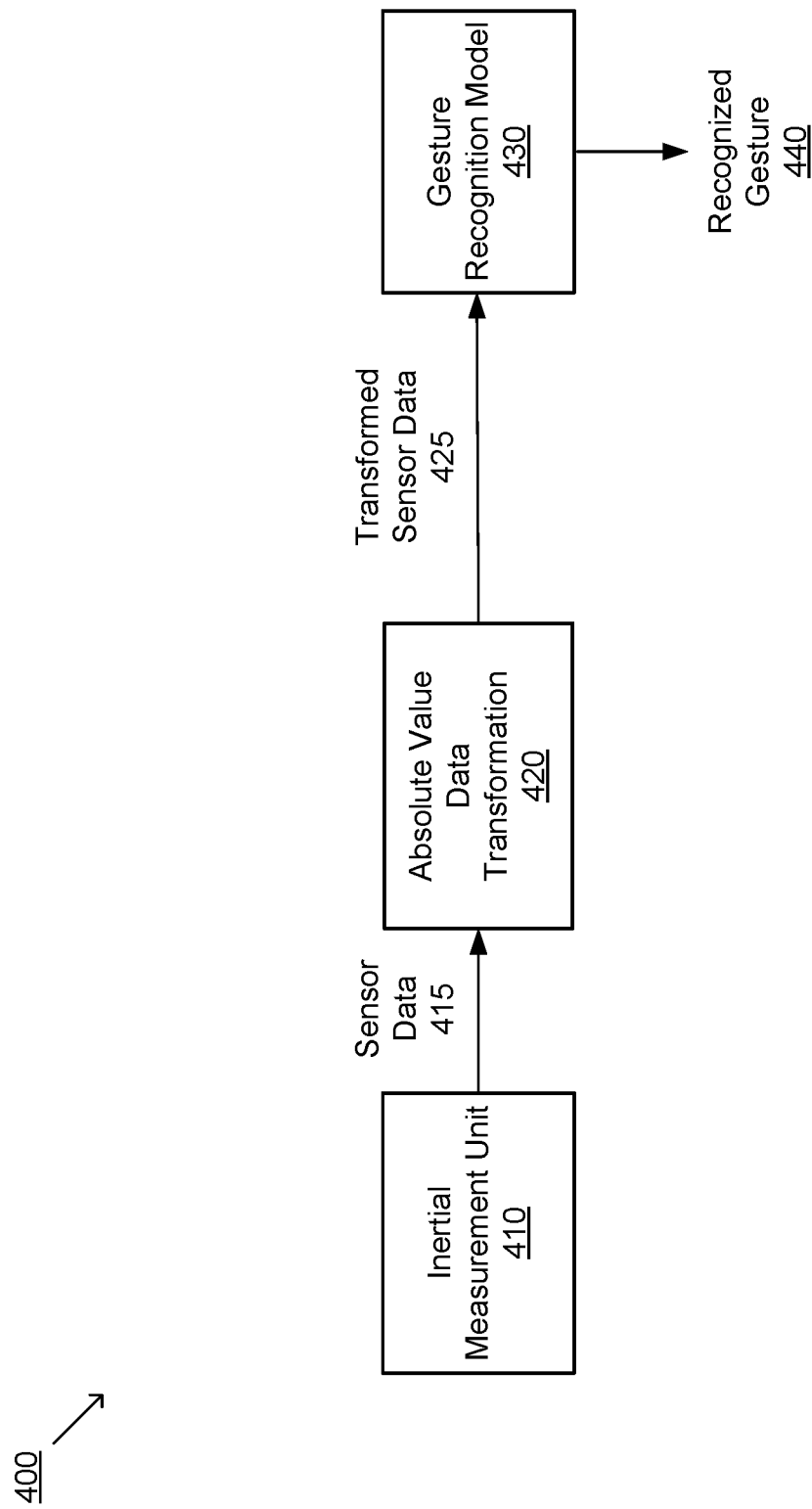
FIG. 4 is a block diagram illustrating an example system for gesture recognition using a gesture recognition model trained independent of the side of a person, in accordance with embodiments.

FIG. 4 is a block diagram illustrating an example system 400 for gesture recognition using gesture recognition model 430 trained independent of the side of a person, in accordance with embodiments. In accordance with various embodiments, system 400 includes inertial measurement unit (IMU) 410, absolute value data transformation module 420, and gesture recognition model 430. It should be appreciated that IMU 410, absolute value data transformation module 420, and gesture recognition model 430, are comprised within a wearable electronic device that is worn on one side of a user.

During operation of system 400, sensor data 415 is generated at IMU 410. For example, sensor data 415 can include data representing specific force, angular rate, and orientation of IMU 410. IMU 410 can include an accelerometer and a gyroscope for generating sensor data 415. It should be appreciated that sensor data 415 can be subjected to a pre-processing for eliminating noise and putting sensor data 415 in a more appropriate format for performing classification. Such pre-processing can be performed at IMU 410 or performed by another component of system 400 (not shown) prior to receipt at absolute value data transformation module 420.

Sensor data 415 is forwarded to absolute value data transformation module 420. Absolute value data transformation module 420 is configured to apply a transformation to sensor data 415, wherein the transformation normalizes sensor data 415 such that transformed gesture data is independent of either side of the user. Absolute value data transformation module 420 is configured to perform an absolute value transformation of the gesture data. In some embodiments, absolute value data transformation module 420 is configured to perform a transformation including an absolute value symmetric transformation of accelerometer data of sensor data 415 and an absolute value rotation transformation of gyroscope data of sensor data 415. In some embodiments, the transformation includes an absolute value symmetric transformation of sensor data 415 for a Y-Z plane of a frame of reference of the IMU and an absolute value rotation of 180 degrees of sensor data 415 around an X-axis of the frame of reference of the IMU. It should be appreciated that any number of transformations can be utilized or performed to accomplish the data transformation. As presented above, FIG. 5B is an example transformation 510 for use in transforming gesture data collected from a device worn on either side of a user to normalized transformed sensor data.

Gesture recognition model 430 receives transformed sensor data 425. Gesture recognition model 430 is configured to perform gesture classification using transformed sensor data 425, where transformed sensor data 425 is normalized to be independent of the side of a user on which a device is worn. Recognized gesture 440 is the output of gesture recognition model 430.

For example, gesture recognition model 430 is deployed in a smart watch and is trained using sensor data normalized to be independent of the side of a user on which a device is worn. During deployment of gesture recognition model 430, all sensor data 415 is normalized to be independent of the side of a user on which the device is worn for use of gesture recognition model 430 for determining recognized gesture 440.

Example Computer System

Figure 6:
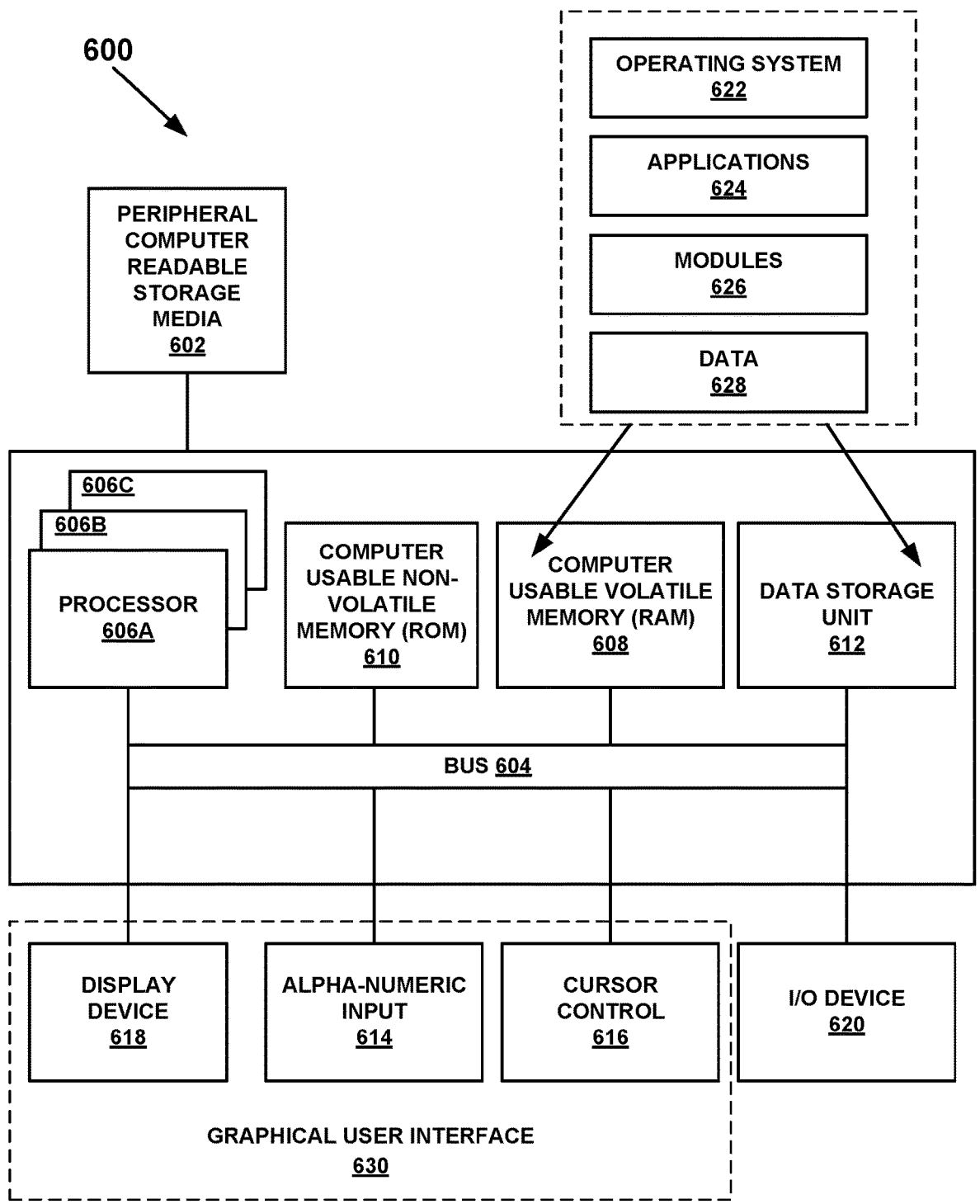
FIG. 6 is a block diagram illustrating an example computer system upon which embodiments of the present invention can be implemented.

FIG. 6 is a block diagram of an example computer system 600 upon which embodiments of the present invention can be implemented. FIG. 6 illustrates one example of a type of computer system 600 (e.g., a computer system) that can be used in accordance with or to implement various embodiments which are discussed herein.

It is appreciated that computer system 600 of FIG. 6 is only an example and that embodiments as described herein can operate on or within a number of different computer systems including, but not limited to, general purpose networked computer systems, embedded computer systems, mobile electronic devices, smart phones, server devices, client devices, various intermediate devices/nodes, standalone computer systems, media centers, handheld computer systems, multi-media devices, and the like. In some embodiments, computer system 600 of FIG. 6 is well adapted to having peripheral tangible computer-readable storage media 602 such as, for example, an electronic flash memory data storage device, a floppy disc, a compact disc, digital versatile disc, other disc based storage, universal serial bus "thumb" drive, removable memory card, and the like coupled thereto. The tangible computer-readable storage media is non-transitory in nature.

Computer system 600 of FIG. 6 includes an address/data bus 604 for communicating information, and a processor 606A coupled with bus 604 for processing information and instructions. As depicted in FIG. 6, computer system 600 is also well suited to a multi-processor environment in which a plurality of processors 606A, 606B, and 606C are present. Conversely, computer system 600 is also well suited to having a single processor such as, for example, processor 606A. Processors 606A, 606B, and 606C may be any of various types of microprocessors. Computer system 600 also includes data storage features such as a computer usable volatile memory 608, e.g., random access memory (RAM), coupled with bus 604 for storing information and instructions for processors 606A, 606B, and 606C. Computer system 600 also includes computer usable non-volatile memory 610, e.g., read only memory (ROM), coupled with bus 604 for storing static information and instructions for processors 606A, 606B, and 606C. Also present in computer system 600 is a data storage unit 612 (e.g., a magnetic or optical disc and disc drive) coupled with bus 604 for storing information and instructions. Computer system 600 also includes an alphanumeric input device 614 including alphanumeric and function keys coupled with bus 604 for communicating information and command selections to processor 606A or processors 606A, 606B, and 606C. Computer system 600 also includes a cursor control device 616 coupled with bus 604 for communicating user input information and command selections to processor 606A or processors 606A, 606B, and 606C. In one embodiment, computer system 600 also includes a display device 618 coupled with bus 604 for displaying information.

Referring still to FIG. 6, display device 618 of FIG. 6 may be a liquid crystal device (LCD), light emitting diode display (LED) device, cathode ray tube (CRT), plasma display device, a touch screen device, or other display device suitable for creating graphic images and alphanumeric characters recognizable to a user. Cursor control device 616 allows the computer user to dynamically signal the movement of a visible symbol (cursor) on a display screen of display device 618 and indicate user selections of selectable items displayed on display device 618. Many implementations of cursor control device 616 are known in the art including a trackball, mouse, touch pad, touch screen, joystick or special keys on alphanumeric input device 614 capable of signaling movement of a given direction or manner of displacement. Alternatively, it will be appreciated that a cursor can be directed and/or activated via input from alphanumeric input device 614 using special keys and key sequence commands. Computer system 600 is also well suited to having a cursor directed by other means such as, for example, voice commands. In various embodiments, alphanumeric input device 614, cursor control device 616, and display device 618, or any combination thereof (e.g., user interface selection devices), may collectively operate to provide a graphical user interface (GUI) 630 under the direction of a processor (e.g., processor 606A or processors 606A, 606B, and 606C). GUI 630 allows user to interact with computer system 600 through graphical representations presented on display device 618 by interacting with alphanumeric input device 614 and/or cursor control device 616.

Computer system 600 also includes an I/O device 620 for coupling computer system 600 with external entities. For example, in one embodiment, I/O device 620 is a modem for enabling wired or wireless communications between computer system 600 and an external network such as, but not limited to, the Internet. In one embodiment, I/O device 620 includes a transmitter. Computer system 600 may communicate with a network by transmitting data via I/O device 620. In accordance with various embodiments, I/O device 620 includes a microphone for receiving human voice or speech input (e.g., for use in a conversational or natural language interface).

Referring still to FIG. 6, various other components are depicted for computer system 600. Specifically, when present, an operating system 622, applications 624, modules 626, and data 628 are shown as typically residing in one or some combination of computer usable volatile memory 608 (e.g., RAM), computer usable non-volatile memory 610 (e.g., ROM), and data storage unit 612. In some embodiments, all or portions of various embodiments described herein are stored, for example, as an application 624 and/or module 626 in memory locations within RAM 608, computer-readable storage media within data storage unit 612, peripheral computer-readable storage media 602, and/or other tangible computer-readable storage media.

Example Methods of Operation

Figure 7:
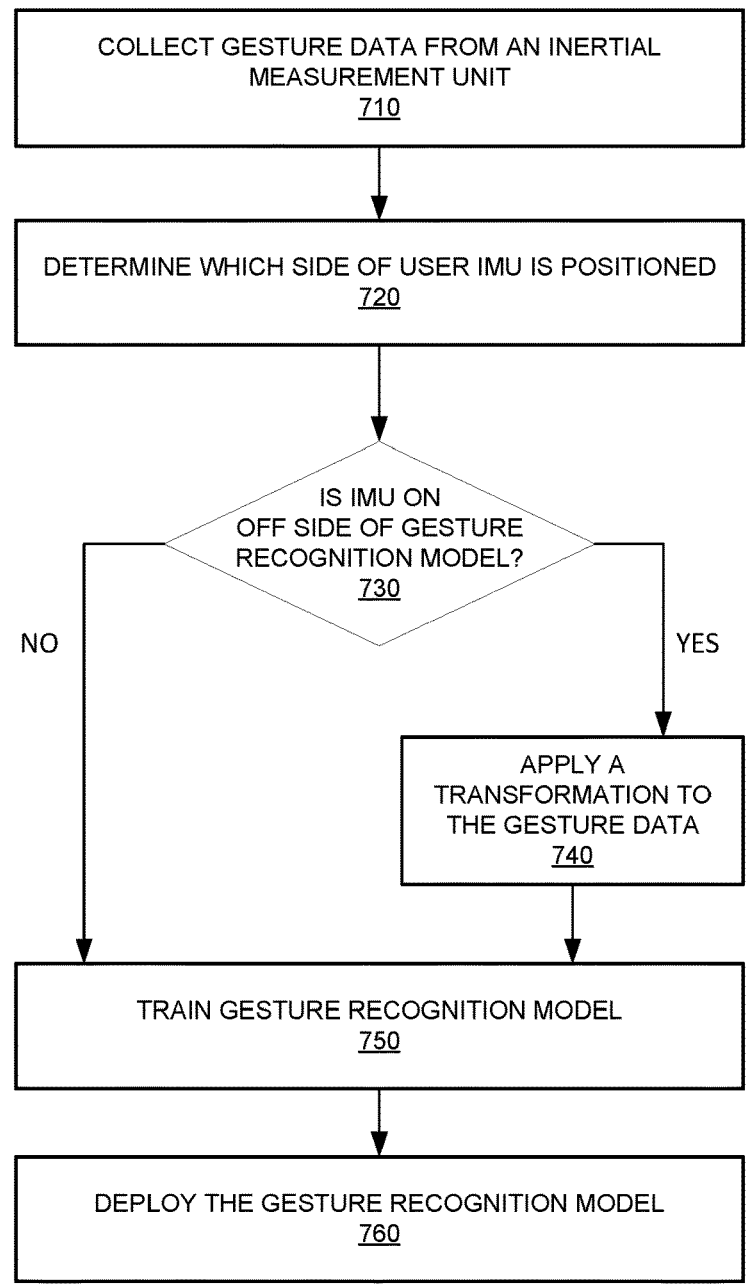
FIG. 7 is a flow diagram illustrating an example method for training a gesture recognition model, according to embodiments.
Figure 8:
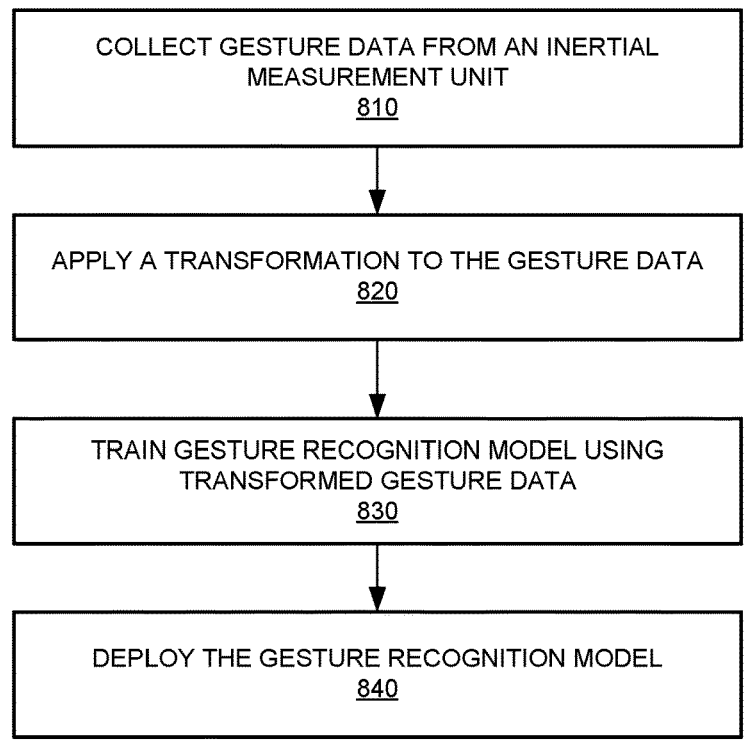
FIG. 8 is a flow diagram illustrating an example method for training a gesture recognition model, according to other embodiments.

The following discussion sets forth in detail the operation of some example methods of operation of embodiments. With reference to FIGS. 7 and 8, flow diagrams 700 and 800 illustrate example procedures used by various embodiments. The flow diagrams include some procedures that, in various embodiments, are carried out by a processor under the control of computer-readable and computer-executable instructions. In this fashion, procedures described herein and in conjunction with the flow diagrams are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, solid state drives/"disks," and optical disks, any or all of which may be employed with computer environments (e.g., computer system 600). The computer-readable and computer-executable instructions, which reside on tangible computer readable storage media, are used to control, or operate in conjunction with, for example, one or some combination of processors of the computer environments and/or virtualized environment. It is appreciated that the processor(s) may be physical or virtual or some combination (it should also be appreciated that a virtual processor is implemented on physical hardware). Although specific procedures are disclosed in the flow diagram, such procedures are examples. That is, embodiments are well suited for performing various other procedures or variations of the procedures recited in the flow diagram. Likewise, in some embodiments, the procedures in the flow diagrams may be performed in an order different than presented and/or not all the procedures described in the flow diagrams may be performed. It is further appreciated that procedures described in the flow diagrams may be implemented in hardware, or a combination of hardware with firmware and/or software provided by computer system 600.

FIG. 7 is a flow diagram 700 illustrating an example method training a gesture recognition model, according to embodiments. The method of flow diagram 700 is for training a gesture recognition model using data from one side of a user, referred to herein as the "primary" side, by transforming training data received from devices worn on the other side of users, referred to herein as the "off" side, to primary side data.

At procedure 710, gesture data is collected from an inertial measurement unit (IMU) positioned on one side of a user, wherein the IMU is capable of collecting data when positioned on either side of the user. At procedure 720, which side of the user on which the IMU is positioned is determined. At procedure 730, it is determined whether the IMU is positioned on the off side of the gesture recognition model. If the IMU is positioned on the primary side of the gesture recognition model, and thus not positioned on the off side of the gesture recognition model, flow diagram 700 proceeds to procedure 750. If the IMU is positioned on the off side of the gesture recognition model, flow diagram 700 proceeds to procedure 740.

At procedure 740, a transformation is applied to the gesture data, wherein the transformation transforms the gesture data such that transformed gesture data is representative of data collected on the primary side of the user. In some embodiments, the transformation includes a symmetric transformation of accelerometer data of the gesture data and a rotation transformation of gyroscope data of the gesture data. In some embodiments, the transformation includes a symmetric transformation of the gesture data for a Y-Z plane of a frame of reference of the IMU and a rotation of 180 degrees of the gesture data around an X-axis of the frame of reference of the IMU.

At procedure 750, a gesture recognition model is trained using the transformed gesture data. At procedure 760, in accordance with some embodiments, the gesture recognition model is deployed in a wearable electronic device for gesture recognition.

FIG. 8 is a flow diagram 800 illustrating an example method training a gesture recognition model, according to embodiments. The method of flow diagram 800 is for training a gesture recognition model using data from devices worn on either side of a user is described, where all gesture data is transformed to be independent of the side of a user on which the device is worn.

At procedure 810, gesture data is collected from an inertial measurement unit (IMU) positioned on one side of a user, wherein the IMU is capable of collecting data when positioned on either side of the user.

At procedure 820, a transformation is applied to the gesture data, wherein the transformation transforms the gesture data such that transformed to be independent of the side of a user on which the device is worn. In some embodiments, the transformation includes an absolute value transformation of the gesture data. In some embodiments, the transformation includes an absolute value symmetric transformation of accelerometer data of the gesture data and a rotation transformation of gyroscope data of the gesture data. In some embodiments, the transformation includes an absolute value symmetric transformation of the gesture data for a Y-Z plane of a frame of reference of the IMU and an absolute value rotation of 180 degrees of the gesture data around an X-axis of the frame of reference of the IMU.

At procedure 830, a gesture recognition model is trained using the transformed gesture data. At procedure 840, in accordance with some embodiments, the gesture recognition model is deployed in a wearable electronic device for gesture recognition.

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed. Rather, the specific features and acts described above are disclosed as example forms of implementing the claims.

Reference throughout this document to "one embodiment," "certain embodiments," "an embodiment," "various embodiments," "some embodiments," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

The invention claimed is:

1. A method for training a gesture recognition model, the method comprising:
   collecting gesture data from an inertial measurement unit (IMU) positioned on one side of a user, wherein the IMU is capable of collecting data when positioned on either side of the user;
   applying a transformation to the gesture data for transforming the gesture data collected from the IMU positioned on the one side of the user to transformed gesture data that is independent of a side of the user, wherein the transformation generates the transformed gesture data that is independent of either side of the user; and
   training a gesture recognition model using the transformed gesture data, wherein the gesture recognition model is independent of a side of a user wearing a device in which the gesture recognition model is deployed.

2. The method of claim 1, wherein the transformation comprises a symmetric transformation of accelerometer data of the gesture data and a rotation transformation of gyroscope data of the gesture data.

3. The method of claim 1, wherein the transformation comprises a symmetric transformation of the gesture data for a Y-Z plane of a frame of reference of the IMU and a rotation of 180 degrees of the gesture data around an X-axis of the frame of reference of the IMU.

4. The method of claim 1, further comprising:
   determining which side of the user on which the IMU is positioned, wherein the transformation is configured to be applied to one side of the user; and
   provided the IMU is not positioned on the side of the user on which the transformation is configured to be applied, training the gesture recognition model using the gesture data.

5. The method of claim 4, wherein the method is performed for a plurality of IMUs positioned on a plurality of users, such that the gesture recognition model is trained using the gesture data for at least one user and the transformed gesture data for at least one user.

6. The method of claim 1, wherein the transformation comprises an absolute value transformation.

7. The method of claim 6, wherein the transformation comprises an absolute value symmetric transformation of accelerometer data of the gesture data and an absolute value rotation transformation of gyroscope data of the gesture data.

8. The method of claim 6, wherein the transformation comprises an absolute value symmetric transformation of the gesture data for a Y-Z plane of a frame of reference of the IMU and an absolute value rotation transformation of 180 degrees of the gesture data around an X-axis of the frame of reference of the IMU.

9. The method of claim 1, further comprising:
   deploying the gesture recognition model to a user device.

10. A wearable system utilizing gesture recognition, the system comprising:
    an inertial measurement unit (IMU) positioned on one side of a user for collecting gesture data based on movement of the IMU;
    a gesture recognition model trained on one side of the user; and
    a processing unit for performing gesture recognition using the gesture data, the processing unit configured to:
       determine a side of the user on which the IMU is positioned;
       provided the IMU is positioned on an opposite side of the user on which the gesture recognition is trained, applying a transformation to the gesture data for transforming the gesture data to transformed gesture data that is representative of gesture data collected from the IMU positioned on a side of the user on which the gesture recognition model is trained, wherein the transformation transforms the gesture data such that the transformed gesture data is transformed to the side of the user on which the gesture recognition model is trained; and
       performing gesture recognition using the transformed gesture data at the gesture recognition model.

11. The system of claim 10, wherein the transformation comprises a symmetric transformation of accelerometer data of the gesture data and a rotation transformation of gyroscope data of the gesture data.

12. The system of claim 10, wherein the transformation comprises a symmetric transformation of the gesture data for a Y-Z plane of a frame of reference of the IMU and a rotation of 180 degrees of the gesture data around an X-axis of the frame of reference of the IMU.

13. A wearable system utilizing gesture recognition, the system comprising:
    an inertial measurement unit (IMU) positioned on one side of a user for collecting gesture data based on movement of the IMU;
    a gesture recognition model that is trained independent of which side of the user the IMU is positioned; and
    a processing unit for performing gesture recognition using the gesture data, the processing unit configured to:
       applying a transformation to the gesture data for transforming the gesture data collected from the IMU positioned on the one side of the user to transformed gesture data that is independent of a side of the user, wherein the transformation is an absolute value transformation that transforms the gesture data such that transformed gesture data is independent of which side of the user the IMU is positioned; and
       performing gesture recognition using the transformed gesture data at the gesture recognition model.

14. The system of claim 13, wherein the transformation comprises an absolute value symmetric transformation of accelerometer data of the gesture data and an absolute value rotation transformation of gyroscope data of the gesture data.

15. The system of claim 13, wherein the transformation comprises an absolute value symmetric transformation of the gesture data for a Y-Z plane of a frame of reference of the IMU and an absolute value rotation transformation of 180 degrees of the gesture data around an X-axis of the frame of reference of the IMU.

16. A non-transitory computer readable storage medium having computer readable program code stored thereon of a method for training a gesture recognition model, the method comprising:

collecting gesture data from inertial measurement units (IMUs) positioned on one side of a plurality of users, wherein the IMUs are capable of collecting data when positioned on either side of the plurality of users;

determining which side of each user of the plurality of users on which the IMU is positioned, wherein a transformation is configured to be applied where the IMU is positioned on a first side of users of the plurality of users, the transformation for transforming the gesture data collected from the IMU positioned on the first side of users of the plurality of users to transformed gesture data that is representative of gesture data collected from the IMU positioned on a second side of users of the plurality of users;

provided the IMU is positioned on the first side of a user of the plurality of users on which the transformation is configured to be applied, applying a transformation to the gesture data, wherein the transformation transforms the gesture data such that transformed gesture data is representative of data collected from an IMU positioned on the second side of the user; and training a gesture recognition model using the gesture data received from an IMU positioned on the second side of users of the plurality of users and the transformed gesture data for the gesture data received from an IMU positioned on the first side of users of the plurality of users.

17. The computer readable storage medium of claim 16, wherein the transformation comprises a symmetric transformation of accelerometer data of the gesture data and a rotation transformation of gyroscope data of the gesture data.

18. The computer readable storage medium of claim 16, wherein the transformation comprises a symmetric transformation of the gesture data for a Y-Z plane of a frame of reference of the IMU and a rotation of 180 degrees of the gesture data around an X-axis of the frame of reference of the IMU.

19. The computer readable storage medium of claim 16, the method further comprising:

deploying the gesture recognition model to a user device.

\* \* \* \* \*